United States Patent [19]

Terry, Jr.

[11] 4,407,602
[45] Oct. 4, 1983

[54] INSULATED COUPLING

[75] Inventor: Vincent G. Terry, Jr., Beverly, Mass.

[73] Assignee: General Electric Company, Lynn, Mass.

[21] Appl. No.: 344,210

[22] Filed: Jan. 29, 1982

[51] Int. Cl.³ .............................................. F16D 1/00
[52] U.S. Cl. .................................... 403/336; 403/356; 403/365
[58] Field of Search ............... 403/356, 365, 358, 337, 403/336; 174/138 D

[56] References Cited

U.S. PATENT DOCUMENTS

| | | | |
|---|---|---|---|
| 2,452,458 | 10/1948 | Hahn | 403/356 X |
| 2,676,279 | 4/1954 | Wilson | 403/337 X |
| 2,937,042 | 5/1960 | Wilder, Jr. | 403/356 X |
| 3,457,438 | 7/1969 | Badcock | 174/138 D X |
| 3,797,960 | 3/1974 | McCarthy | 174/138 D X |
| 4,028,909 | 6/1977 | Jancic et al. | 64/28 |
| 4,083,639 | 4/1978 | Terry | 403/16 |

Primary Examiner—Andrew V. Kundrat
Attorney, Agent, or Firm—James W. Mitchell

[57] ABSTRACT

A coupling between a prime mover and a dynamoelectric machine should include electrical insulation between the connected shafts so as to preclude the transmission of eddy currents between the dynamoelectric machine to the prime mover shaft. This insulation may be provided at the radial interface between coupling members. However, it has been found that the torque carrying capability of a coupling may be enhanced by providing a circumferential electrical insulation between radially inner and outer hubs which comprise the coupling member on the dynamoelectric machine side of the coupling.

6 Claims, 5 Drawing Figures

INSULATED COUPLING

BACKGROUND OF THE INVENTION

This invention relates, in general, to coupling members for rotating machinery and in particular to a coupling member between a prime mover and a dynamoelectric machine wherein electrical isolation is maintained between the driver and driven shafts and wherein the torque carrying capability of the coupling is enhanced.

Torque transmitting couplings between a prime mover and load normally require only that the bolts connecting the two mating couplings be able to carry the torque transmitted between the coupling members. When the load is a dynamoelectric machine it is desirable to electrically isolate the coupled shafts to avoid the transfer of electrical current between the two shafts which might set up potentially damaging currents in the prime mover bearing supports and oil seal surfaces. One such coupling is shown in U.S. Pat. No. 4,083,639 to Terry incorporated herein by reference and assigned to the assignee of the present invention.

A limiting factor in the torque carrying capability of an electrically insulated coupling is the strength of the electrical insulation. For example, the mechanical strength of electrical insulation in the coupling described may be only about a third of the yield strength of a metal bolt. Referring to the aforementioned U.S. Patent to Terry, the coupling members are joined at a radial interface which includes a washer which may be formed from an insulation material. The area across which the coupling torque is transmitted is equal to the number of bolts multiplied by the washer thickness and bolt diameter. A further aggravating factor of the prior art radial interface design is that transmitted forces are in shear whereas electrical insulation is more capable of withstanding compression forces.

The present invention improves upon the torque transmitting capability of a coupling by providing a circumferential interface between inner and outer hubs which distributes the torque along the entire length of the insulation wrapped around a plurality of coupling keys. Moreover the force is applied in compression rather than shear.

OBJECTS OF THE INVENTION

It is an object of the invention to provide a coupling between a prime mover and a dynamoelectric machine which will electrically insulate the connecting shafts from one another.

It is another object of the invention to provide a coupling between a prime mover and dynamoelectric machine with improved torque carrying capability.

The novel features believed characteristic of the present invention are set forth in the appended claims. The invention itself, however, together with further objects and advantages thereof, may best be understood with reference to the following description taken in connection with the drawings.

SUMMARY OF THE INVENTION

The invention comprises a coupling wherein one of the coupling members includes concentric radially inner and outer hubs which are electrically insulated from one another and wherein the insulation extends in the circumferential direction and along the axial length of the coupling. The insulation is completely internal to the coupling and therefore does not interface between the two coupling members. Means are provided at each end of the coupling to maintain the axial position of the hubs relative to one another.

DETAILED DESCRIPTION OF THE INVENTION

Figure 1:
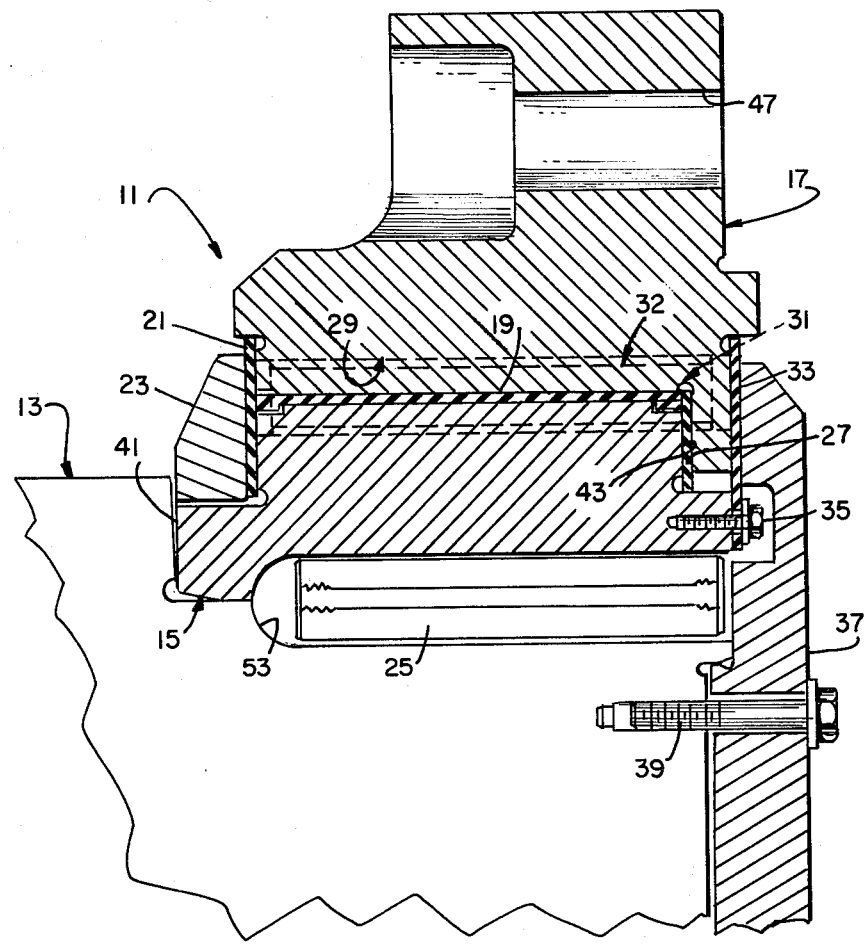
FIG. 1 is an elevation cross section of a portion of a coupling member in accordance with the present invention.
Figure 2:
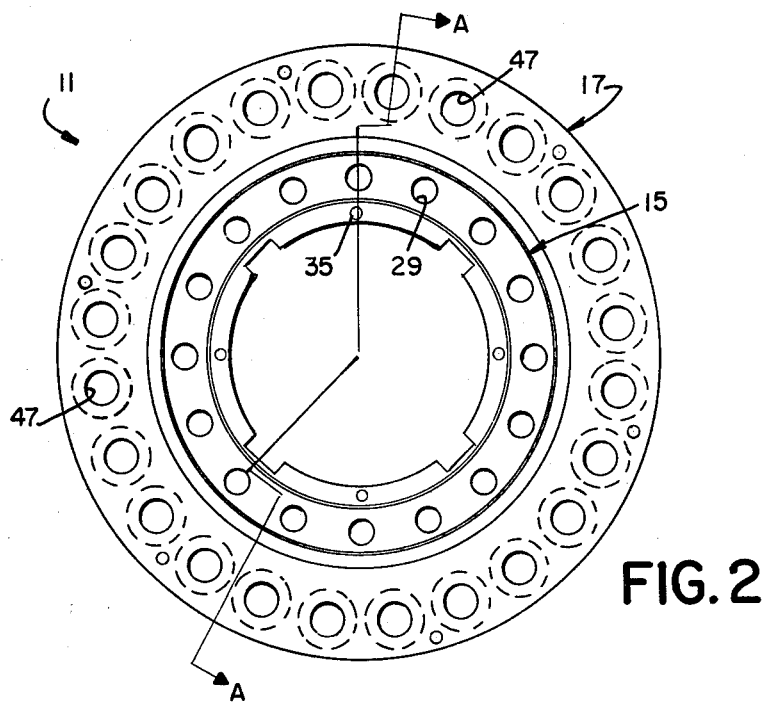
FIG. 2 is an end view of a coupling member in accordance with the present invention.
Figure 3:
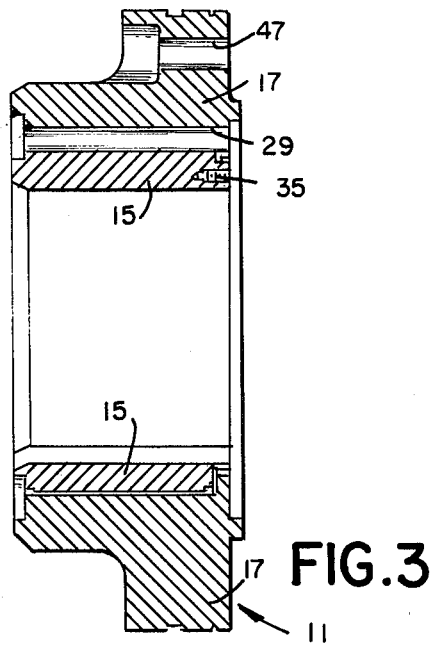
FIG. 3 is an elevation view of the coupling member in FIG. 2 taken along with lines A—A of FIG. 2.

FIGS. 1, 2 and 3 present different views of the same invention. FIG. 1 is an elevation view of a portion of the dynamoelectric machine coupling member. FIG. 2 is an end view of the coupling member and FIG. 3 is a section view A—A taken from FIG. 2. A coupling between a driver and driven shaft is best shown in U.S. Pat. No. 4,083,639 which has been previously referred to and incorporated by said reference. It should be noted that the coupling comprises two coupling members each of which is affixed to its respective shaft. A dynamoelectric machine coupling member 11 is shown in FIG. 1 as being shrink fitted to a dynamoelectric machine rotor shaft stub 13. This coupling member to be described is only one half of the coupling. The coupling member 11 is comprised of an inner coupling hub 15 and an outer coupling hub 17 which are concentrically mounted on the dynamoelectric machine rotor. The radially inner coupling hub 15 is surrounded by an insulation wrap 19 which is cured and machined concentric at the outer cylindrical surface of the inner coupling hub 15. This insulation layer may be comprised of hard and baked mica material. An insulating ring 21 is positioned adjacent to a retainer ring 23 which is shrink fitted onto the inner hub 15.

The outer hub 17 is shrink fitted onto the inner hub 15 over the insulating surface 19 and an insulating ring 27 previously mounted onto the inner hub. A plurality of holes or keyways 29 are drilled into the interface between the now assembled inner and outer hubs and steel cylindrical keys 31 are inserted into these keyways. The steel keys are wrapped with an electrical insulation 32 such as scotch-ply in order to maintain the electrical insulation between the two hubs. The assembly is further insulated by an insulation ring 33 which is fixed to the inner hub by a plurality of bolts 35 only one of which is shown. A steel thrust plate 37 provides an axial restraint against coupling member movement on the shaft and against relative axial movement between the respective coupling hubs. Shoulder 41 on the rotor shaft prevents axial movement by the coupling members inner hub whereas shoulder 43 on the inner coupling member prevents axial movement by the coupling member outer hub where it abuts an outer hub portion of reduced diameter at the radial abutment interface or shoulder 43.

Complete electrical isolation of the outer hub 17 from the inner hub 15 is provided by insulation wrap 19, insulating rings 21, 27 and 33; and insulating keys 31. The assembled coupling member 11 is shrink fitted to the dynamoelectric machine shaft and locked against rotation by a plurality of keys 25 of the type described in U.S. Pat. No. 4,083,639. The coupling member 11 may then be attached to the prime mover coupling member by a plurality of bolts, not shown, through bolt holes 47.

The manner in which the coupling member is manufactured comprises the following steps: wrapping an inner hub with electrical insulation and a first radial insulating ring 27; shrink fitting an outer hub over the inner hub; drilling keyways 29 into the interface between the inner and outer hubs for insertion of insulated keys 31. The method further comprises the steps of adding a second radial insulating ring 21 to the assembled inner and outer hubs and then shrink fitting a retaining ring onto the inner hub. Thus assembled, the inner and outer hubs together comprise a coupling member which is shrink fitted to the dynamoelectric mahine shaft whereupon the interface between the coupling member and the dynamoelectric machine shaft is drilled and keyed. Finally a third radial insulating ring is added as well as an end thrust plate. Keyways 53 are drilled for inserting keys 25.

Figure 4:
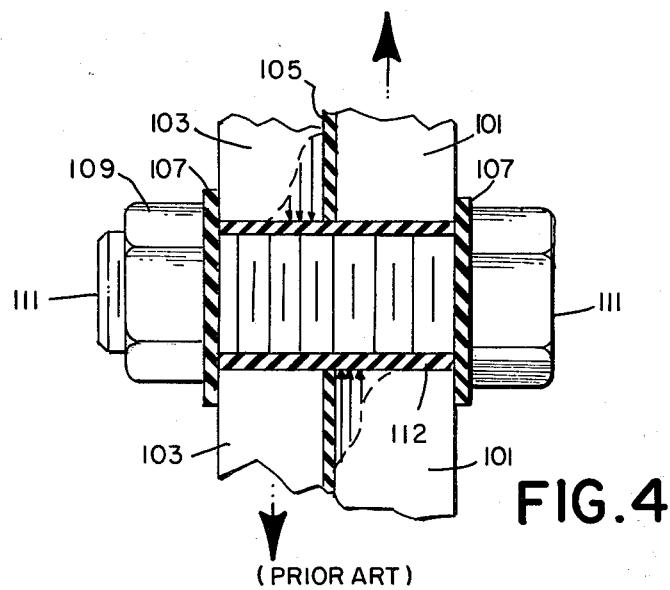
FIG. 4 is a force reaction diagram in accordance with a prior art coupling.
Figure 5:
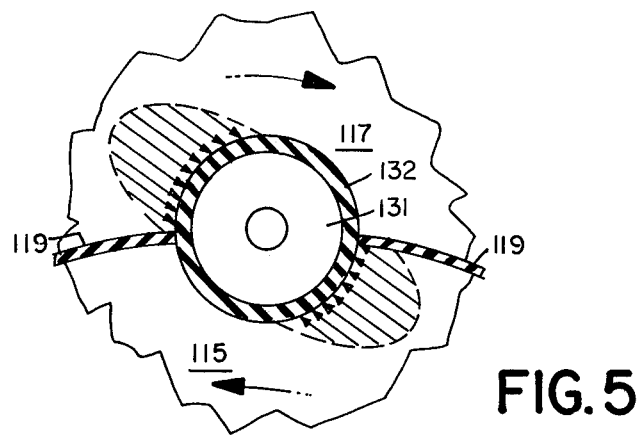
FIG. 5 is a force reaction diagram in accordance with the present invention.

Having described the parts unique to the present invention, FIGS. 4 and 5 show the difference in forces applied in the prior art (FIG. 4) as well as the present invention (FIG. 5). In FIG. 4, a prime mover coupling member 101 is joined with a dynamoelectric machine coupling member 103 at a radial interface which includes insulation washer 105. This is similar to the coupling shown in U.S. Pat. No. 4,083,639. There are also insulating washers 107 at either side of the nut 109 and bolt 111 connection shown. There is also an insulation wrap 112 around each of the bolts 111. The shear force diagram is shown at the interface between the coupling members and is distributed over an area of insulation which approximates the thickness of the washer multiplied by the diameter of the bolt and the total number of bolts. The combination of a shear force over a relatively small area has been a limiting factor in the load able to be applied across the coupling.

FIG. 5 is a schematic force diagram of the coupling in accordance with the present invention. The outer coupling hub 117 and the inner coupling hub 115 are shrink fitted to one another with insulation layer 119 there between. Hollow keys 131 surrounded by insulation 132 are inserted between the two hubs. The torque transmitted between the hub interface is now in the nature of a compression force which the insulation is more capable of withstanding. Moreover, the area of force distribution is now the length of the key rather than the diameter of the key. Thus the coupling as described will have a higher force carrying capability than the prior art coupling previously described.

While there has been shown what is considered to be a preferred embodiment of the invention, it is also understood that other modifications may be made therein which may be obvious to one of ordinary skill in the art. One such modification may include applying the described invention to the prime mover shaft. It is intended to claim all such modifications as fall within the true spirit and scope of the invention.

What is claimed is:

1. A coupling for joining two rotatable shafts, the coupling including two oppositely facing coupling members each mounted on a respective shaft; and, at least one coupling member comprising:
   a radially inner hub mounted to its respective shaft;
   a radially outer hub mounted concentrically around said radially inner hub and adapted to be connected to its opposite coupling member;
   electrical insulation at a circumferential interface between the inner and outer hubs whereby the hubs are electrically insulated from one another;
   a first annular row of keys disposed at the interface between the shaft and the inner hub; and,
   a second annular row of keys disposed at the interface between the inner and outer hubs, said second row of keys being electrically insulated.

2. The coupling recited in claim 1 wherein the coupling member further comprises:
   a reduced diameter portion formed on said outer hub which abuts a radial portion of said inner hub to prevent relative axial movement between the two hubs; and,
   a radially extending insulating ring disposed between said inner and outer hub abutting portions.

3. The coupling recited in claim 1 wherein the coupling member further comprises:
   a retaining ring shrink fitted onto the inner hub and abutting a shoulder formed on its respective shaft; and,
   a radially extending insulating ring disposed between said retaining ring and said inner and outer hubs.

4. The coupling recited in claim 1 wherein the coupling member further comprises:
   a thrust plate bolted to said shaft; and,
   a radially extending insulating ring mounted between said thrust plate and said inner and outer hubs.

5. The coupling recited in claim 1 wherein the coupling member further comprises:
   a first radially extending insulating ring mounted between said inner and outer hubs at a radial abutment interface;
   a second radially extending insulating ring mounted between the inner and outer hubs and a retaining ring mounted on said inner hub; and,
   a third radially extending insulating ring mounted between the inner and outer hubs and a thrust plate bolted to said shaft.

6. A coupling for joining two rotatable shafts, the coupling including two oppositely facing coupling members each mounted on a respective shaft; and at least one coupling member comprising:
   an inner hub mounted to its respective shaft;
   an outer hub mounted concentrically over said inner hub;
   electrical insulation disposed at a circumferential interface between the inner and outer hubs;
   a first annular row of keys disposed in the interface between the inner hub and shaft;
   a second annular row of insulated keys disposed in the interface between the inner and outer hubs;
   a first radial abutment between the inner and outer hubs including a first radially extending insulating ring between said abutting portions;
   a retaining ring mounted on said inner hub and abutting said inner and outer hubs;
   a second radially extending insulating ring between said abutting portions;
   a thrust plate mounted on said shaft and abutting said inner and outer hubs; and,
   a third radially extending insulating ring between said abutting portions.

* * * * *